US009461926B2

United States Patent
Orten et al.

(10) Patent No.: US 9,461,926 B2
(45) Date of Patent: Oct. 4, 2016

(54) PACKET PRIORITIZING IN AN INDUSTRIAL WIRELESS NETWORK

(71) Applicant: ABB RESEARCH LTD, Zürich (CH)

(72) Inventors: Pal Orten, Asker (NO); Tomas Lennvall, Västerås (SE); Mikael Gidlund, Sundsvall (SE)

(73) Assignee: ABB RESEARCH LTD, Zürich (CH)

( * ) Notice: Subject to any disclaimer, the term of this patent is extended or adjusted under 35 U.S.C. 154(b) by 0 days.

(21) Appl. No.: 14/429,888

(22) PCT Filed: Oct. 1, 2012

(86) PCT No.: PCT/EP2012/069317
§ 371 (c)(1),
(2) Date: Mar. 20, 2015

(87) PCT Pub. No.: WO2014/053152
PCT Pub. Date: Apr. 10, 2014

(65) Prior Publication Data
US 2015/0244635 A1      Aug. 27, 2015

(51) Int. Cl.
*H04W 28/02* (2009.01)
*H04L 12/841* (2013.01)
(Continued)

(52) U.S. Cl.
CPC ........... *H04L 47/286* (2013.01); *H04L 1/1877* (2013.01); *H04L 47/2458* (2013.01);
(Continued)

(58) Field of Classification Search
CPC ............... B29C 70/526; H04L 1/1877; H04L 47/2458; H04L 47/286; H04L 47/323; H04L 67/12; H04L 67/322; H04W 28/021; H04W 4/005; H04W 72/1242

USPC ......................................................... 370/230
See application file for complete search history.

(56) References Cited

U.S. PATENT DOCUMENTS 6,760,309 B1    7/2004  Rochberger et al.
7,668,150 B2    2/2010  Ofuji et al.
(Continued)

FOREIGN PATENT DOCUMENTS

CN      102 256 317 A    11/2011
EP       1 193 921 A2     4/2002
(Continued)

OTHER PUBLICATIONS

Akerberg et al. "Efficient integration of secure and safety critical industrial wireless sensor networks", XP055140032, Dec. 31, 2011, pp. 1-13, retrieved on Sep. 12, 2014 from the internet: URL:http://jwcn.eurasipjournals.com/content/pdf/1687-1499-2011-100.pdf.
(Continued)

*Primary Examiner* — Huy D Vu
*Assistant Examiner* — Nizam Ahmed
(74) *Attorney, Agent, or Firm* — Birch, Stewart, Kolasch & Birch, LLP (57) ABSTRACT

A wireless communication device providing a node in the network includes a wireless transmitter, a wireless receiver, a transmission buffer, and a packet prioritizing unit configured to obtain data relating to packets to be transmitted in the network, obtain indications of the remaining lifetime of the packets, where the indications are based on the time needed for reaching a destination node, prioritize the packets according to the remaining life time indications, where the prioritization is made in ascending order from an indication of a low remaining life time to a high remaining lifetime, and place the packets in the transmission buffer for transmission according to the prioritization.

20 Claims, 4 Drawing Sheets

(51) Int. Cl.
*H04L 29/08* (2006.01)
*H04W 4/00* (2009.01)
*H04W 72/12* (2009.01)
*H04L 12/833* (2013.01)
*H04L 12/823* (2013.01)
*H04L 1/18* (2006.01)

(52) U.S. Cl.
CPC .......... *H04L47/323* (2013.01); *H04L 67/12* (2013.01); *H04L 67/322* (2013.01); *H04W 4/005* (2013.01); *H04W 28/021* (2013.01); *H04W 72/1242* (2013.01)

(56) References Cited

U.S. PATENT DOCUMENTS

| | | | |
|---|---|---|---|
| 7,965,726 B2 | 6/2011 | Wei et al. | |
| 8,149,715 B1* | 4/2012 | Goel | H04L 45/123 370/238 |
| 8,243,710 B1* | 8/2012 | Benveniste | H04W 74/0816 370/310 |
| 2005/0108425 A1* | 5/2005 | Rabinovitch | H04L 45/04 709/238 |
| 2007/0014268 A1 | 1/2007 | Kim et al. | |
| 2007/0019641 A1* | 1/2007 | Pai | H04L 29/06 370/389 |
| 2010/0039284 A1* | 2/2010 | Hall | G06Q 10/06 340/8.1 |
| 2010/0061321 A1 | 3/2010 | Calvanese Strinati et al. | |
| 2011/0176521 A1 | 7/2011 | Park et al. | |
| 2012/0008698 A1* | 1/2012 | Ktenas | H04L 1/0029 375/259 |
| 2013/0028088 A1* | 1/2013 | Do | H04L 1/0002 370/235 |

FOREIGN PATENT DOCUMENTS

| | | |
|---|---|---|
| EP | 2 148 478 A1 | 1/2010 |
| EP | 2 405 702 A1 | 1/2012 |
| EP | 2 437 440 A1 | 4/2012 |
| WO | WO 2008/025620 A1 | 3/2008 |
| WO | WO 2011/137426 A2 | 11/2011 |

OTHER PUBLICATIONS

Srinivasan "TTL routing for VoIP congestion reduction", ICCS 2002, vol. 1, 2002 IEEE, pp. 524-528, XP010629273.

* cited by examiner

FIG. 6

PACKET PRIORITIZING IN AN INDUSTRIAL WIRELESS NETWORK

FIELD OF INVENTION

The present invention generally relates to wireless communication devices in industrial wireless networks. More particularly the present invention relates to a method for prioritizing the sending of packets in an industrial wireless network as well as to a wireless communication device and a computer program product for a wireless communication device.

BACKGROUND

Wireless sensor networks are known to be used in process control systems. Examples on such networks are ZigBee and WirelessHart, ISA100, WIA-PA and Bluetooth. There also exist some WLAN based sensor networks.

In such systems packets may remain in the system waiting for transmission for a long time. This may be problematic for a number of reasons. An old packet may be useless. In for instance process control an old measurement value is at best of no use and harmless and at worst harmful and may lead to problems in the control. Furthermore if there are old packets in the system, the system resources are not used efficiently. Useful data may wait in a buffer for transmission as useless data is being transmitted.

There is therefore a need for prioritizing transmissions.

Prioritization in a mobile phone system is for instance described in U.S. Pat. No. 7,668,150, while US 2011/0176521 describes prioritization of packets in a wireless sensor network.

However, there is still a need for improvement within the field.

There is therefore a need for an improvement in relation to industrial wireless networks.

SUMMARY OF THE INVENTION

The present invention is directed towards providing an improved industrial wireless communication network.

One object of the present invention is to provide an improved method for prioritizing the sending of packets in an industrial wireless network.

This object is according to a first aspect of the present invention achieved through a method for prioritizing the sending of packets in an industrial wireless network, the method being performed by a wireless communication device being a node in the industrial wireless communication network controlling a process, the method comprising the steps of:

obtaining, data relating to packets to be transmitted in the network, obtaining indications of the remaining lifetime of said packets, said indications being based on the time needed for reaching a destination node, prioritizing the data packets according to the remaining life time indications, where the prioritization is made in ascending order from an indication of a low remaining life time to high remaining lifetime, and transmitting the packets according to the prioritization.

Another object of the present invention is to provide an improved wireless communication device in an industrial wireless network.

This object is according to a second aspect of the present invention achieved through a wireless communication device for an industrial wireless network, the wireless communication device providing a node in the industrial wireless network and comprising:

a wireless transmitter,
a wireless receiver,
a transmission buffer, and
a packet prioritizing unit configured to: obtain data relating to packets to be transmitted in the network, obtain indications of the remaining lifetime of said packets, said indications being based on the time needed for reaching a destination node, prioritize the packets according to the remaining life time indications, where the prioritization is made in ascending order from an indication of a low remaining life time to high remaining lifetime, and place the packets in the transmission buffer for transmission according to the prioritization.

Another object of the present invention is to provide a computer program product for a wireless communication device, which computer program product provides an improved wireless communication device.

This object is according to a third aspect achieved by a computer program product for a wireless communication device, for a wireless communication device, the wireless communication device providing a node in an industrial wireless network, the computer program product comprising a data carrier with computer program code which when run on a processor forming a prioritizing unit (50) of the wireless communication device, causes the prioritizing unit to:

obtain, data relating to packets to be transmitted in the network, obtain indications of the remaining lifetime of said packets, said indications being based on the time needed for reaching a destination node, prioritize the data packets according to the remaining life time indications, where the prioritization is made in ascending order from an indication of a low remaining life time to high remaining lifetime, and transmit the packets according to the prioritization.

The present invention has a number of advantages. By introducing the above-mentioned mechanism it is simple to allow multiple applications to communicate packets over the same wireless sensor network. Packets from a critical application with very strict latency requirements may be prioritized over less critical applications (like monitoring), unless the monitoring packets have a short time to live.

BRIEF DESCRIPTION OF THE DRAWINGS

The present invention will in the following be described with reference being made to the accompanying drawings, where FIG. 1 schematically shows a control system for controlling a process using an industrial wireless network.

DETAILED DESCRIPTION OF THE INVENTION

In the following, a detailed description of preferred embodiments of the invention will be given.

Figure 1:
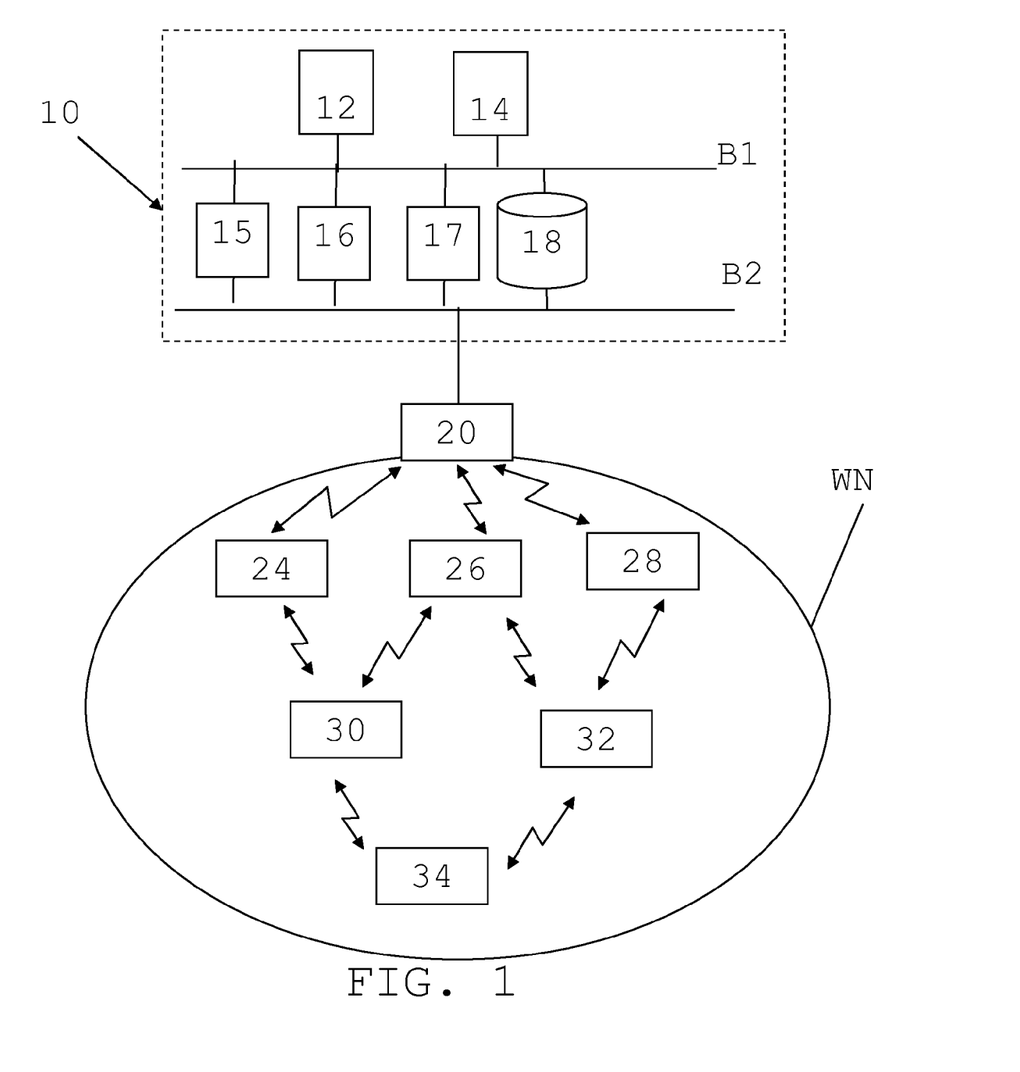

FIG. 1 schematically shows a control system 10 for a process, i.e. a process control system. The process may be an industrial process and may furthermore be any of a number of different types of processes such as a pulp and paper production process, an oil or gas production or refining process, an electric power transmission process or an electric power distribution process. The control system 10 may for instance be an object based computerised system for controlling the process.

In FIG. 1 the process control system 10 includes a number of operator terminals 12 and 14 connected to a first bus B1. There is furthermore a second bus B2 and between the first and second busses B1 and B2 there are connected a first server 15 providing control of the process, a second server 16 providing a safety application and a third server 17 providing a monitoring application for instance in the form of a maintenance determining application. There is also a database 18 provided between the two buses B1 and B2 and in this database 18 data, like historical data relating to all of the above mentioned applications is stored. To the second bus B2 there is furthermore connected a gateway 20, which gateway is in turn connected to a wireless network WN. The wireless network WN may be an industrial network and may also be a wireless communication network. It may more particularly be a wireless sensor and actuator network (WSAN) and may thus be an industrial wireless sensor and actuator network, compatible with an industrial standard such as WirelessHart. In this wireless network WN there are shown seven exemplifying nodes. There is a first node 24, a second node 26, a third node 28, a fourth node 30, a fifth node 32 and a sixth node 34. These nodes are provided in the form of wireless communication devices or wireless field devices. These field devices as well as the gateway are nodes in the industrial wireless network WN. The gateway 20 may therefore be considered to be a seventh node.

The field devices are devices that are interfaces to the process and they communicate wirelessly with the gateway 20. In the exemplifying network the first, second and third nodes 24, 26, 28 are furthermore shown as communicating with the gateway 20, while the fourth and fifth nodes 30 and 32 are communicating with the first, second and third nodes 24, 26 and 28. The sixth node 34 in turn communicates with the fourth and fifth nodes 30 and 32. Although the fourth, fifth and sixth nodes 30, 32 and 34 do not communicate directly with the gateway 20, they are still able to communicate with it using hop or multi-hop technique. When for instance the sixth node 34 is sending data, this data is relayed to the gateway 20 via the fifth or sixth node together with via the first, second or third node 24, 26 and 28. In a similar manner the first, second and third node 24, 26, 28 may act as relay nodes for data sent by the fourth and fifth nodes 30 and 32.

The field devices implementing the first, second, third, fourth, fifth and sixth nodes 24, 26, 28, 30, 32 and 34 may if involved in the first application be responsible for performing some type of control activity of the process, such as measuring a process parameter like a physical property of the process or providing a control activity in the process, such as actuating a valve, operating a pump, a switch etc. The actual control of the field devices is performed by the server 15. They may also provide data for the other applications.

Figure 2:
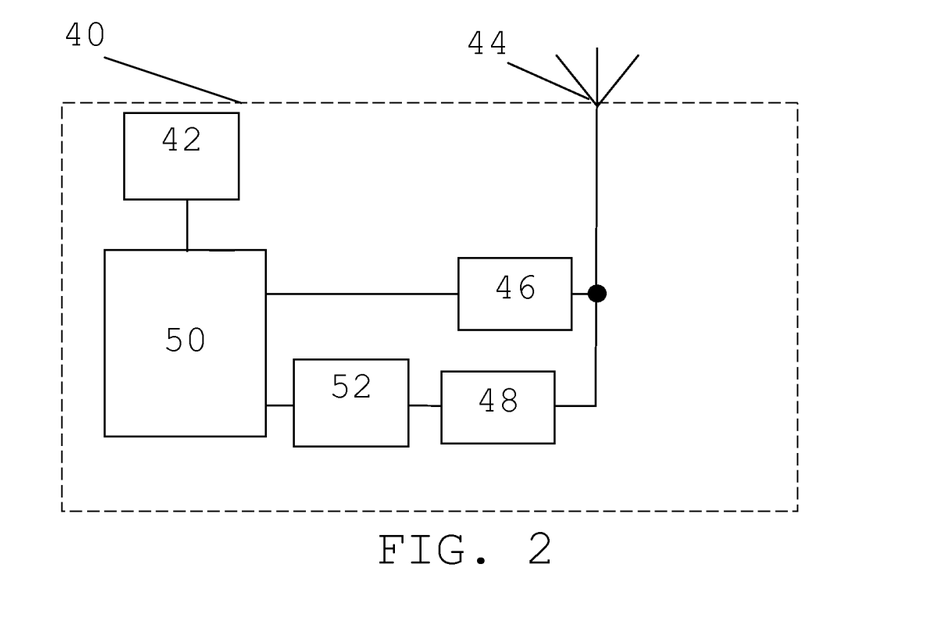
FIG. 2 shows a block schematic of a wireless communication device in the industrial wireless network, FIG. 3 schematically shows a data packet provided with a TTL indicator.

FIG. 2 shows a block schematic of units in a wireless communication device 40 that makes up a node in the industrial wireless network. This wireless communication device 40 may be a field device that implements a node in the network, such as the fourth node 30. However, it may also be the gateway 20. The wireless communication device 40 here comprises a packet prioritizing unit 50, which is connected to an application handling unit 42 arranged for providing data to and receiving data from an application. It is also connected to a transmitter circuit 48 or wireless transmitter via a transmission buffer 52. The transmitter circuit 48 is in turn connected to an antenna 44, which is also connected to a receiver circuit 46 or wireless receiver. The receiver and transmitter circuits 46 and 48 may be combined in one circuit, a transceiver circuit.

Figure 3:
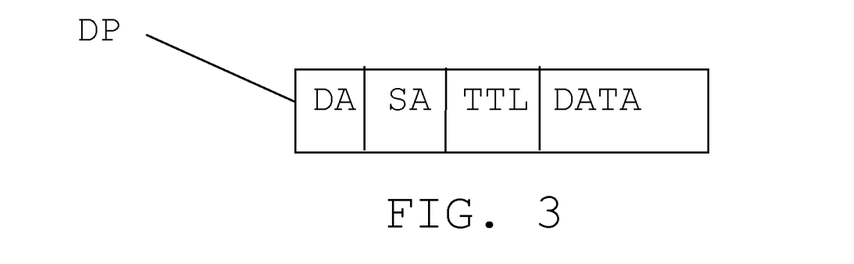

FIG. 3 shows an exemplifying data packet DP comprising a destination address DA, a source address SA, a time-to-live indicator TTL and data DATA.

Figure 4:
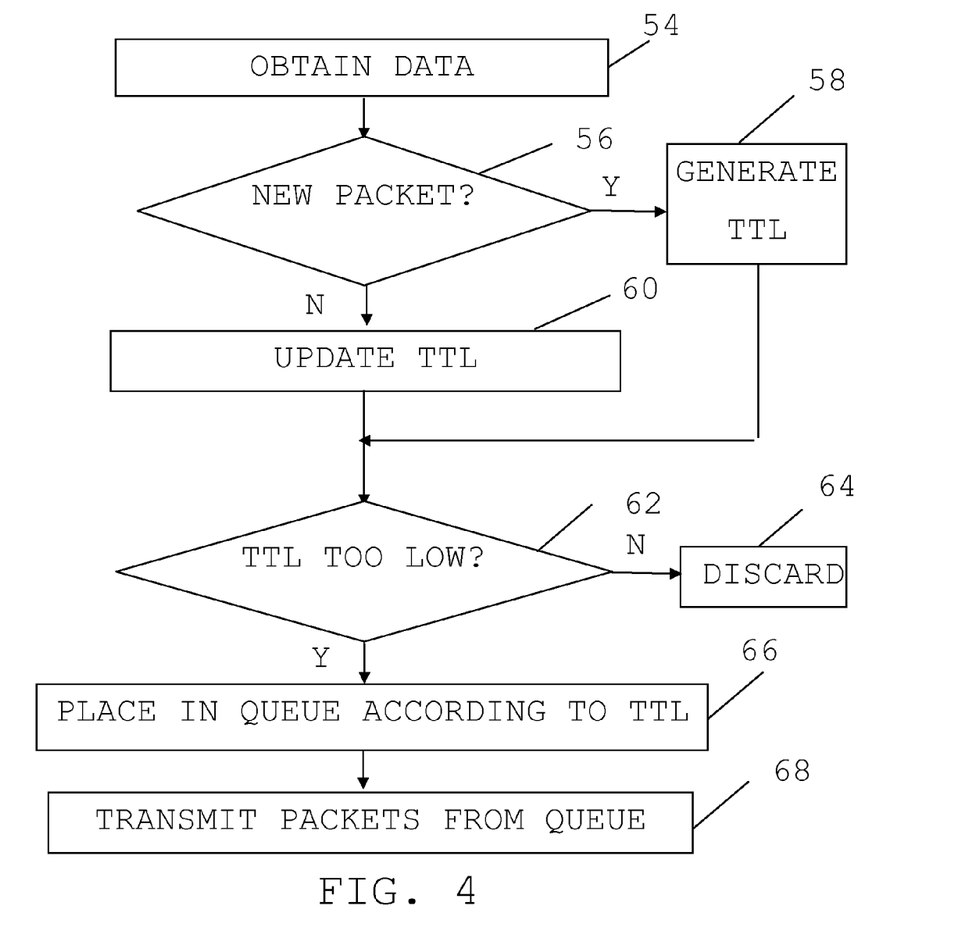
FIG. 4 shows a flow chart of a number of method steps in a method for prioritizing the sending of packets being performed by the wireless communication device, FIG. 5 schematically shows two curves of TTL values in relation to time and process period, and FIG. 6 schematically shows a data carrier carrying program code for implementing a prioritizing unit of a wireless communication device.

The functioning of a first embodiment of the present invention will now be described with reference also being made to FIG. 4, which shows a flow chart of a number of method steps being performed in the wireless communication device.

As was mentioned above there may be a number of applications in the system, where the control of the process performed by the first server 15 is one application, a second application, the safety application performed by the second server 16 and a third application, a service application performed by the third server 17. These types of applications may have different priorities. A safety application may for instance have the highest priority. Process control may have a second highest priority, while a maintenance determining application may have a low priority. The applications may furthermore have different inherent time criticality. The process control may be a real-time closed loop control of the process. In this case there is a time in which measurements are fresh enough to have any use in the control. The process may thus have very strict latency requirements and the control period that is based on this latency requirement may need to be considered.

At times there may be a lot of data that is needed to be transmitted. Data may thus be queued up waiting for transmission as packets. Because of this packets may remain in the system waiting for transmission for a long time. This may be problematic for a number of reasons.

The present invention is provided for addressing this situation.

Packets existing in the network a long time after they are useful for the process are not only meaningless, they also consume energy in the transmitting nodes, consume network capacity that could be used for non-expired packets, and thus also create additional latency for newer packets. There is currently no good mechanism for distinguishing between the different applications with different requirements utilizing the network and thus no good priority mechanism for packets.

It may furthermore be assumed that the network is a wireless mesh network where packets are transmitted from sensing transmitters to the gateway 20 or other destination nodes, via a number of intermediate nodes. Typically, there will at any time be many nodes where packets are generated and transmitted over the multi-hop mesh network. It is furthermore assumed that the transmission paths are set up and defined by some Radio Resource Manager (RRM) or similar entity, for instance provided in the gateway 20, or decided upon by the individual nodes (different systems have different schemes). In any case the traffic will propagate through the network by being transmitted from node to node. Individual nodes may then typically from time to time have several packets for transmission, and may thus experience the dilemma of transmission prioritization.

The traditional way to solve this is to apply the principle of first in-first out. In this way packets will not change their order, and thus maintain some kind of fairness. In this scenario individual packets may still arrive at the destination out of order compared to their order from the originating node if they took different paths through the network.

According to the invention an indication of remaining lifetime of packets, in the following denoted a time-to-live (TTL) parameter is defined and used to decide on the priorities and whether a packet is allowed to still exist in the network.

The method will now be described in relation to the wireless device 40, which in this example is the third node 30.

The method starts with the prioritizing unit 50 obtaining data related to the transmission of a data packet, step 54. This data may be one of a number of types of data. It may be newly obtained data that is to be transmitted for the first time in a packet. It may thus be data obtained in the node in question via the application handling unit 42. It may as an example be sensor data sensed by a sensor of the node 30. It may also be a packet received via the receiver 46 and antenna 44, which packet is intended for another node such as the gateway 20. As another alternative it may be a negative acknowledgement NACK, also received via the receiver 46 and antenna 44, which is an indication that a packet has been received incorrectly and may therefore be considered to be a request for retransmission of a packet.

The prioritizing unit 50 therefore analyses the data and performs different activities based on these. These activities all involve obtaining a time to live indicator. If the data is new data to be sent in a new packet received from the application handling unit 42, step 56, then a new time to live indicator TTL is generated, step 58.

TTL for the new packet may be set as a function of the packets criticality C, distance d to the destination, such as to the gateway 20, and period P of the process. The criticality C is the criticality or importance of the application in the system. This means that the indications of remaining life time TTL are determined differently for different applications, where safety applications may be the most critical, process control applications may be the second most critical and a maintenance application may be the least critical. Thus a packet being part of a closed loop control will have a higher criticality than a packet carrying monitoring sensor information but may have a lower criticality than a safety application. The distance may be provided as a value corresponding to the time needed for reaching the destination node. This time may furthermore consider the number of hops required for the packet to reach the destination node. The period of the application may for a control application be the period within which the application is able to act on process measurements. Thus, for each packet there is an initial time to live indication TTL, which may be defined as a function of the critically, C, distance d and period P. If the number of nodes in the path between the source and destination is n, then n=0 for the source node. The initial time to live indication may then be provided as $$TTL(n=0)=f(C,d,P) \quad (1)$$

As one alternative the initial value may be set as $$TTL(0)=d \quad (2)$$

In this way a TTL value is determined for a new packet to be transmitted. The initial TTL is thus calculated at the source node.

If the data is not a new packet, then it is either a NACK concerning a transmitted packet or a received packet. In both cases the packet in question or rather the TTL value of the packet is updated, step 60.

The packet may for instance be updated according to the following principle $$TTL(n)=TTL(n-1)-X(t,C,P,d), \quad (3)$$

where n thus is the node number in the path between source and destination. A retransmission may here be considered to be equivalent to adding a node in the path.

X is in turn a function of criticality C, distance d to the destination, period P of the process and time t from the initial transmission of the packet.

X may furthermore be a function that increases with t. By this expression the forwarding of a packet as well as the retransmission of a packet reduces TTL, since X is a function of the time since the packet was generated (or initially transmitted from the source node).

Here it is possible that for event-triggered applications where there is no obvious period, P may be set to a value where the measurement is too old to have any useful value for the process anymore.

As an example TTL may be set as $$TTL(n)=TTL(n-1)-k*C*P/(P-t) \quad (4)$$

where k is a constant 0<k<1. With this choice of functions the time-to-live will be reduced by some fraction of C at each new schedule (either in a new node or for retransmission in the same node) since d is a distance measure.

It should be realized that as an alternative it is possible to use (P−t)/P in the expression above instead of P/(P−t).

If there are two applications communicating packets on the same network, where the first is a time critical application (for instance closed loop control), and the second a less time critical application, for instance process monitoring, then the parameters could be defined as follows:

First application: C=0.9 (high criticality), d=8, P=15 (some process dependant unit of time)

Third application: C=0.3 (low criticality), d=8, P=35 (some process dependant unit of time)

For both examples k=0.2 may be used, but this parameter may be adjusted for faster or slower change, and it may be also application dependent.

It can thus be seen that upon reception of a packet, the prioritizing unit 50 calculates a new TTL for the packet and upon receipt of a NACK for a packet, it recalculates the packet TTL for the transmitted packet.

After having updated the TTL value of a packet or after generating a new TTL value, then the prioritizing unit 50 investigates if the TTL has a remaining life time that is insufficient for reaching the destination node, which may be that the TTL is zero or below zero or will become zero before reaching the destination node.

In case the TTL value is too low, step 62, it is discarded, step 64, which may involve the prioritizing unit 50 throwing away the packet after receiving it. If there is a retransmission, it may involve removing the packet from the transmission buffer 52.

When the time the packet has existed exceeds the period of the process (for instance in a control application), the packet is no longer useful and it should be removed from the transmit queue in the buffer 52. The same will be done if the packet has no chance of reaching the destination within the remaining time to live.

In case the TTL value is high enough, step 62, then it is placed in a transmission queue according to the TTL value, step 66. If the data packet is a new packet or a received packet DP, this may involve placing the packet DP with the TTL value in the buffer for transmission, while if the new TTL value concerns a retransmission, the placing in queue may involve providing an already queued packet with a new TTL value. The prioritization is further made in ascending order from an indication of a low remaining life time to high remaining lifetime. In all intermediate nodes where packets are buffered, the packet with the lowest TTL should be given priority when choosing which packet to schedule for transmission. It can thus be seen that the packet is placed at the appropriate place in the transmit queue of the buffer 52 that corresponds to the TTL value.

Thereafter the transmitter 48 transmits the packets DP from the queue in the buffer 52 according to the prioritization, step 68, which involves first transmitting packets with the lowest TTL values.

The functions and input data for updating time to live values may be included in the packets together with the TTL values. As an alternative it is possible that the nodes have the knowledge. In this case the packets may include some necessary data such as the criticality value and process period value.

The invention has several advantages. By introducing the above-mentioned mechanism it is simple to allow multiple applications to communicate packets over the same wireless sensor network. Packets from a critical application with very strict latency requirements will be prioritized over less critical applications (like monitoring) unless the monitoring packets have a short time to live.

Figure 5:
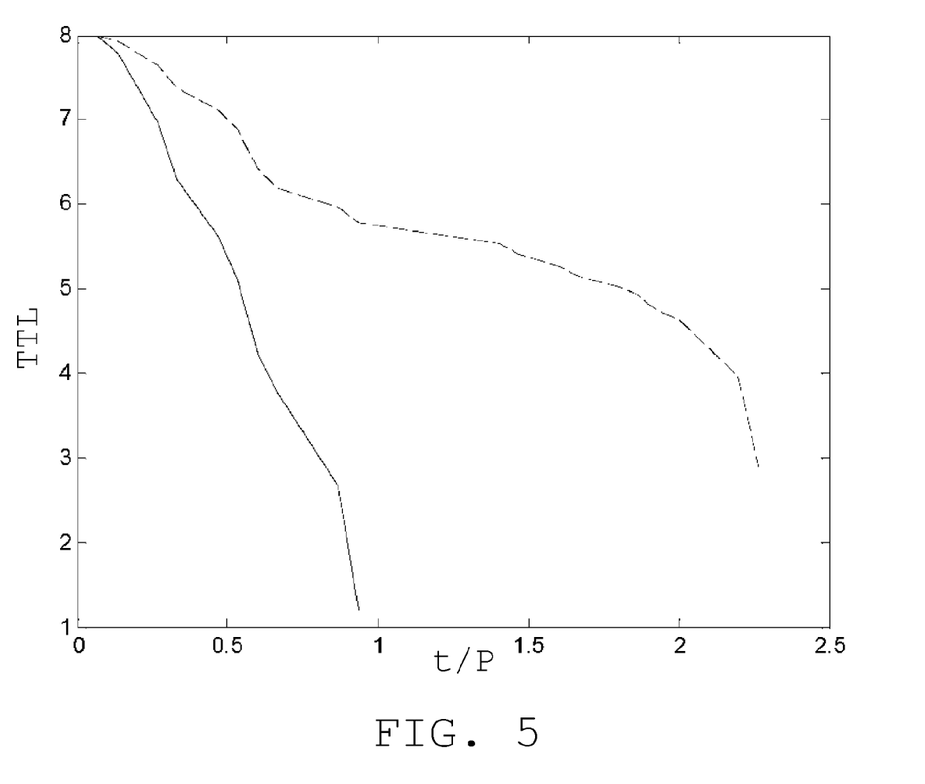

FIG. 5 shows the development of TTL as function of time since the packet was generated. The dashed line is for a packet of the third application, while the solid line is for an application of the first application.

As can be seen in the figure, a packet of low criticality may have a lower TTL than the critical application if it has been around in the network for some longer time.

The use of the fraction P/(P−t) instead of (P−t)/P in the equation above has the following consequence. The use of (P−t)/P would have given a faster decrease in the beginning close to the source and then a slower decrease of TTL. In the example above the reduction of TTL is speeded up as the time t gets closer to the period P. This was done because this is in many cases the critical point where the packet will be removed from the network.

Figure 6:
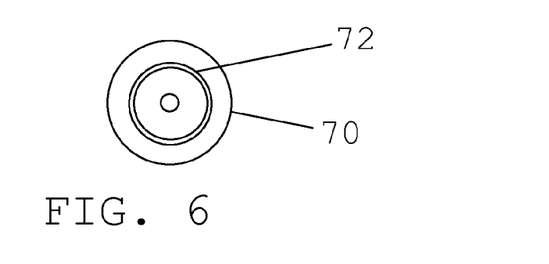

The prioritizing unit of the wireless communication device may be realized in the form of a discrete component, such as an Application Specific Integrated Circuit (ASIC) or Field-Programmable Gate Array (FPGA) circuit, which may also comprise the other units and circuits of the first field device. However, the node configuration control unit may also be realized through a processor with an associated program memory including computer program code for performing the functionality of the node configuration control unit when being run on the processor. This computer program product can be provided as a data carrier such as one or more CD ROM discs or one or more memory sticks carrying computer program code, which provides the above-described prioritizing unit when being run by said processor. One such data carrier 70 in the form of a CD ROM disk with a computer program 72 carrying such computer program code is schematically shown in FIG. 6.

From the foregoing discussion it is evident that the present invention can be varied in a multitude of ways. It shall consequently be realized that the present invention is only to be limited by the following claims.

The invention claimed is:

1. A method for prioritizing the sending of packets in an industrial wireless network (WN), the method being performed by a wireless communication device being a node in the industrial wireless communication network controlling an industrial process, the method comprising the steps of:
obtaining, data relating to packets to be transmitted in the network, the packets comprising packets associated with different applications;
obtaining indications of the remaining lifetime of said packets, said indications being based on the time needed for reaching a destination node, wherein the indications of remaining life time are determined differently for different applications based on the importance of the application and the indications of remaining lifetime of packets related to the control of the process are based also on the period of control in which measurements are fresh enough to have any use in the control;
prioritizing the data packets according to the remaining life time indications, where the prioritization is made in ascending order from an indication of a low remaining life time to high remaining lifetime; and
transmitting the packets according to the prioritization,
wherein the obtaining of data comprises receiving a packet having an indication of remaining lifetime and updating the indication of remaining lifetime according to an updating function $$TTL(n)=TTL(n-1)-k*C*P/(P-t) \text{ or } TTL(n-1)-k*C*(P-t)/P,$$

where $TTL(n)$ is the indication of remaining life time for the received packet of the node, $TTL(n-1)$ is the indication of a remaining life time of a previous node, k is a constant $0<k<1$, C the packet criticality, P is the period of the process, and t is the time from the initial transmission of the packet.

2. The method according to claim 1, further comprising discarding packets with indications of remaining life time that is insufficient for reaching the destination nodes.

3. The method according to claim 2, wherein said indications with insufficient remaining life time comprise packets with indications of zero or less remaining life times.

4. The method according to claim 1, wherein the time needed for reaching a destination node considers the number of hops required for the packet to reach a destination node.

5. The method according to claim 1, wherein the obtaining of data comprises obtaining data generated in the node for transmission as new data packets and the obtaining of an indication of remaining life time comprises generating the indication.

6. The method according to claim 5, wherein the indication of remaining life time is generated as a function of packet criticality C, distance d to the destination and period P of the process.

7. The method according to claim 1, wherein the obtaining of data comprises receiving a retransmission indication (NACK) for a transmitted packet and updating the indication of remaining lifetime according to an updating function.

8. A wireless communication device for an industrial wireless network controlling an industrial process, the wireless communication device providing a node in the industrial wireless network and comprising:
a wireless transmitter;
a wireless receiver;
a transmission buffer; and
a packet prioritizing unit configured to:
obtain data relating to packets to be transmitted in the network, the packets comprising packets associated with different applications,
obtain indications of the remaining lifetime of said packets, said indications being based on the time needed for reaching a destination node, wherein the indications of remaining life time are determined differently for different applications based on the importance of the application and the indications of remaining lifetime of packets related to the control of the process are based also on the period of control in which measurements are fresh enough to have any use in the control,
prioritize the packets according to the remaining life time indications, where the prioritization is made in ascending order from an indication of a low remaining life time to high remaining lifetime, and
place the packets in the transmission buffer for transmission according to the prioritization,
wherein the packet prioritizing unit when being configured to obtain data is configured to receive a packet having an indication of remaining lifetime and is further configured to update the indication of remaining lifetime according to an updating function $$TTL(n)=TTL(n-1)-k*C*P/(P-t) \text{ or } TTL(n-1)-k*C*(P-t)/P,$$

where $TTL(n)$ is the indication of remaining life time for the received packet of the node, $TTL(n-1)$ is the indication of a remaining life time $TTL$ of a previous node, $k$ is a constant $0<k<1$, $C$ the packet criticality C, $P$ is the period of the process, and $t$ is the time from the initial transmission of the packet.

9. The wireless communication device according to claim 8, the prioritizing unit being further configured to discard packets with indications of remaining life time that is insufficient for reaching the destination nodes.

10. The wireless communication device according to claim 9, wherein said indications with insufficient remaining life time comprise packets with indications of zero or less remaining life times.

11. The wireless communication device according to claim 8, wherein the time needed for reaching a destination node considers the number of hops required for the packet to reach a destination node.

12. A computer program product embodied on a non-transitory computer readable medium for a wireless communication device, the wireless communication device providing a node in an industrial wireless network controlling an industrial process,
the computer program product comprising computer program code which when run on a processor forming a prioritizing unit of the wireless communication device, causes the prioritizing unit to:
obtain, data relating to packets to be transmitted in the network, the packets comprising packets associated with different applications,
obtain indications of the remaining lifetime of said packets, said indications being based on the time needed for reaching a destination node, wherein the indications of remaining life time are determined differently for different applications based on the importance of the application and the indications of remaining lifetime of packets related to the control of the process are based also on the period of control in which measurements are fresh enough to have any use in the control,
prioritize the data packets according to the remaining life time indications, where the prioritization is made in ascending order from an indication of a low remaining life time to high remaining lifetime, and
transmit the packets according to the prioritization,
wherein the obtaining of data comprises receiving a packet having an indication of remaining lifetime and the updating comprises updating the indication of remaining lifetime according to an updating function $$TTL(n)=TTL(n-1)-k*C*P/(P-t) \text{ or } TTL(n-1)-k*C*(P-t)/P,$$

where $TTL(n)$ is the indication of remaining life time $TTL(n)$ for the received packet of the node, $TTL(n-1)$ is the indication of a remaining life time $TTL(n-1)$ of a previous node, $k$ is a constant $0<k<1$, $C$ the packet criticality C, $P$ is the period of the process, and $t$ is the time from the initial transmission of the packet.

13. The method according to claim 2, wherein the time needed for reaching a destination node considers the number of hops required for the packet to reach a destination node.

14. The method according to claim 3, wherein the time needed for reaching a destination node considers the number of hops required for the packet to reach a destination node.

15. The method according to claim 2, wherein the obtaining of data comprises obtaining data generated in the node for transmission as new data packets and the obtaining of an indication of remaining life time comprises generating the indication.

16. The method according to claim 3, wherein the obtaining of data comprises obtaining data generated in the node for transmission as new data packets and the obtaining of an indication of remaining life time comprises generating the indication.

17. The method according to claim 4, wherein the obtaining of data comprises obtaining data generated in the node for transmission as new data packets and the obtaining of an indication of remaining life time comprises generating the indication.

18. The method according to claim 2, wherein the obtaining of data comprises receiving a retransmission indication (NACK) for a transmitted packet and updating the indication of remaining lifetime according to an updating function.

19. The method according to claim 3, wherein the obtaining of data comprises receiving a retransmission indication (NACK) for a transmitted packet and updating the indication of remaining lifetime according to an updating function.

20. The method according to claim 4, wherein the obtaining of data comprises receiving a retransmission indication (NACK) for a transmitted packet and updating the indication of remaining lifetime according to an updating function.

* * * * *